_United States Patent Office_

3,149,984
Patented Sept. 22, 1964

3,149,984
LEAD GLASS FOR OPTICAL USE
Marga Faulstich, Mainz, Germany, assignor to Jenaer Glaswerk Schott & Gen., Mainz, Germany, a German corporation
No Drawing. Filed Dec. 14, 1961, Ser. No. 159,464
Claims priority, application Germany Dec. 17, 1960
6 Claims. (Cl. 106—53)

The present invention relates to a lead glass for optical use, with particularly good chemical stability.

The known glass compositions which are made of flints or heavy flints of lanthanum or barite have an in adequate chemical stability. Some of these compositions are very easily affected by acids and others by weathering. This is true particularly of such glass compositions containing lead which, because of their very small inclination toward crystallization and their relatively low cost, are preferred for use in optical systems. It is known that when adding small amounts of zirconium oxide, titanium oxide, or thorium oxide, the chemical resistance of the glass may be slightly improved. These additions must, however, not exceed 6% when using zirconium oxide, or about 4% when using titanium oxide, since a higher content of these materials will strongly increase the tendency of the composition toward crystallization and also result in a glass with a strong yellow tint. Thorium oxide is generally added only to such glass compositions if it is not possible in any other manner to attain the desired optical characteristics, or if without any addition of thorium the tendency of the glass toward crystallization would cause considerable difficulties in the glass manufacture.

According to the present invention it has been found that it is possible to produce a glass of a very high chemical stability if it is composed of 5 to 67% by weight of PbO, 3 to 16% by weight of $Al_2O_3$, 10 to 45% by weight of $La_2O_3$, and a remainder of 20 to 51% by weight which preferably contains 15 to 36% of $B_2O_3$ and/or $SiO_2$ by weight of the total glass composition. Very good results are also attained if the remainder contains up to 7% by weight, preferably 1 to 7%, of highly refractive oxides of the group of tetravalent or pentavalent oxides, such as zirconium oxide, titanium oxide, tantalum oxide, or niobium oxide. Furthermore, up to 12% by weight preferably less than 7%, of bivalent oxides, except PbO, may be added. Preferably at least a total of 1% by weight of the highly refractive oxides should be present since the addition of these oxides exerts a favorable influence upon the stability of the glass, as well as its durability. The amounts to be added of the individual materials, are, however, limited insofar as the content in zirconium oxide should not exceed 5% by weight, since the tendency of the glass toward crystallization will otherwise again increase. When using titanium oxide, the upper limit amounts to 4% because of the discoloration which would otherwise occur, while with tantalum oxide and niobium oxide the stated limit of 7% by weight is primarily because of the high cost of these components. Bivalent oxides, except lead oxide, are generally of advantage only if a relatively high $\nu$-value is desired is desired, and generally their amount will be made less than 7%.

The accompanying tables show comparisons of different optical glass compositions according to the invention with known compositions of the same optical position. The known compositions are stated in column $a$, while the compositions as stated in columns $b$, $c$ and $d$ are optical glass compositions according to the invention.

These tables indicate that especially those glass compositions which are particularly of importance are entirely free of bivalent oxides, except lead oxide.

The reason for the particular effect of the first-mentioned combination of PbO, $Al_2O_3$ and $La_2O_3$ has so far not been discovered. However, this effect is very evident from the values of the chemical stability as indicated in the tables. These values of the chemical stability are based upon the values of log $a_2$ (attack by standard acetate) to indicate the attack by acids and the length of time until the first traces of disintegration by weathering are noticeable (W.F.). High log $a_2$ values indicate a low attack-ability, while low log $a_2$ values indicate a strong attack-ability. A difference in the log $a_2$ of 1 corresponds to a ten-fold attack per unit time.

It may be regarded as a known fact that aluminum oxide, either alone or in the presence of lanthanum, also improves the durability of numerous kinds of glass compositions. This effect is, however, far less evident than that of the combination of the three mentioned materials. Even when applying only the relatively small lower limits which have been indicated by very low values, a considerable improvement of log $a_2$ is already noticeable. The durability-improving influence increases, however, considerably if the content of aluminum oxide is raised from 3 to 5%, and it practically reaches its log $a_2$ limit already with less than 10% of aluminum oxide (see Table 3). A further increase in the alumium content is valuable only insofar as the weathering resistance is concerned. A certain content of silicic acid, for example of about 10%, has a favorable influence upon the chemical stability, while an increase to more than 20% impairs the color of the glass.

The manner of production of the glass according to the invention is that conventionally used for flint-type glass. The mixture of components is melted in a platinum crucible at approximately 1250° to 1300° C., which requires about 90 minutes per 1 kg.; thereafter the refining operation is carried out at a temperature increase of about 50° to 100°, then the melted material is stirred until the glass has the proper viscosity for casting, and it is thereupon cast into a preheated steel mold which is cooled in the usual manner. The raw glass which is thus attained may be converted into a fine optical glass in the conventional manner by a subsequent cooling operation.

The following example is furnished by way of illustration:

EXAMPLE

An optical raw glass of the following composition is to be produced (Table 1, column 4$b$):

| | Percent by weight |
|---|---|
| $B_2O_3$ | 19.3 |
| $SiO_2$ | 9.9 |
| PbO | 37.1 |
| $Al_2O_3$ | 13.4 |
| $La_2O_3$ | 17.8 |
| $ZrO_2$ | 2.5 |

There are mixed in a conventional mixer the following materials in the amounts stated:

| | G. |
|---|---|
| $H_3BO_3$ | 34.6 |
| $SiO_2$ | 9.9 |
| $Pb_3O_4$ | 17.8 |
| $Al(OH)_3$ | 20.2 |
| $ZrO_2$ | 2.5 |

This mixture corresponds when molten to about 100 grams of calculated oxides. There are admixed to this mixture the usual conventional refining agents, such as 0.3 gram $As_2O_3$ or 0.3 gram $Sb_2O_3$. The mixture is then melted in a platinum crucible to a temperature of about 1300° C. The length of time required for mixing depends upon the particular type of mixer employed. The length of time required for the melting operation depends, at least to some extent, upon the size of the crucible and the charge, but ordinarily a 100 gram (calculated oxides) charge, requires about 15 to 20 minutes. The molten mixture is then usbjected to the refining operation at a temperature of about 1370° C. and until no further gas bubbles are noticeable in the melt. The length of time required for the refining operation also depends, to some extent, upon the size of the crucible and the charge, but the above 100 gram charge (calculated oxides), requires about 20 to 30 minutes. The molten mixture is homogenized by stirring with a platinum stirrer for about 20 minutes at a temperature between about 1030 and 1050° C., and the same is poured into an iron mold which is at a temperature of about 1030° C.

The mass in the mold is then cooled in the conventional manner, starting from its transformation point, in this case from a temperature of 540° C. After being cooled to room temperature, the resulting raw glass can be cut, ground or polished.

The optical raw glass may be subsequently further treated in accordance with conventional methods, such as the conventional optical-fine cooling for the production of highest quality optical glass. Such after-treatment, however, is not part of the instant invention.

Other glass compositions or raw glass compositions in accordance with the invention and useable for optical purposes may be obtained by substituting in the above example compounds yielding or calculable as the oxides in Tables 1, 2 and 3 and identifying compositions in accordance with the invention 1b, 2b, 3b, 5b, 5c, 5d, 6b, 6c, 7b, 7c, 7d and 8b. The compounds used for preparing the mixture to be molten, as set forth in said example, are in each case admixed in the form of compounds conventionally used in the glass mixing art to yield the oxides to be present in the final glass composition, and may comprise oxides, hydrates, acids, carbonates, etc., as is well understood in the art. In each case the compounds added are admixed in amounts calculated to yield the desired oxide content. In all cases the optical values are those furnished in the tables.

Besides the mentioned bivalent oxides, magnesium oxide and strontium oxide may also be added. Log $a_2$ indicates the length of time per hour which is necessary in order to disintegrate a glass layer with a thickness of $0.1\mu$ in standard acetate pH=4.6 at 25° C. The transformation point corresponds to the temperature of a viscosity of $10^{13.4}$ poises. The average cooling time of 100 grams of glass by 100° amounts to one hour.

The substances which have not been mentioned in the balance of claim 1 are those components being given in the claims 2 to 6.

*Table 1*

| Oxides | 1 | | 2 | | 3 | | 4 | |
|---|---|---|---|---|---|---|---|---|
| | a | b | a | b | a | b | a | b |
| $B_2O_3$ | 23.3 | 30.5 | 42.1 | 31.4 | 6.1 | 20.0 | 23.3 | 19.3 |
| $SiO_2$ | 12.3 | 4.9 | | | 22.8 | | 12.3 | 9.9 |
| PbO | 35.3 | 29.6 | 12.1 | 9.1 | 61.6 | 40.0 | 35.3 | 37.1 |
| $Al_2O_3$ | 1.3 | 13.2 | | 13.1 | | 13.0 | 1.3 | 13.4 |
| $La_2O_3$ | 2.8 | 19.7 | 26.4 | 44.4 | 5.2 | 25.0 | 2.8 | 17.8 |
| $ZrO_2$ | | 2.0 | 7.7 | 2.0 | | 2.0 | | 2.5 |
| $TiO_2$ | | | | | | | | |
| CaO | 4.8 | | 11.7 | | 2.0 | | 4.8 | |
| BaO | 3.0 | | | | | | 3.0 | |
| ZnO | 14.7 | | | | 1.1 | | 14.7 | |
| $ThO_2$ | 2.5 | | | | | | 2.5 | |
| $Na_2O$ | | | | | 0.4 | | | |
| $K_2O$ | | | | | 0.8 | | | |
| $Ta_2O_5$ | | | | | | | | |
| nd | 1.701 | 1.70 | 1.717 | 1.719 | 1.795 | 1.795 | 1.723 | 1.723 |
| ν | 41 | 41.7 | 47.9 | 48.1 | 28.4 | 27.5 | 38.0 | 37.8 |
| log $a_2$ | 1.2 | 3.4 | 2.1 | 3.6 | 1.3 | 3.7 | −1.0 | 3.2 |
| W.F.* | 18 | 55 | 24 | 51 | 26 | 41 | 17 | |

*Weathering factor.

*Table 2*

| Oxides | 5 | | | | 6 | | |
|---|---|---|---|---|---|---|---|
| | a | b | c | d | a | b | c |
| $B_2O_3$ | 20.2 | 27.0 | 23.6 | 17.4 | 25.9 | 19.3 | 19.2 |
| $SiO_2$ | 5.1 | | | 6.0 | | 3.1 | 4.0 |
| PbO | 24.2 | 11.0 | 27.5 | 26.7 | 53.7 | 58.9 | 40.5 |
| $Al_2O_3$ | 1.9 | 13.0 | 12.3 | 11.9 | | 13.9 | 13.1 |
| $La_2O_3$ | 18.1 | 45.0 | 30.7 | 32.1 | | 6.9 | 23.2 |
| $ZrO_2$ | 3.6 | | | | | 1.0 | |
| $TiO_2$ | | 4.0 | | 0.4 | | | |
| CaO | 11.1 | | | | | | |
| BaO | 2.8 | | | | | | |
| ZnO | 13.0 | | | | 17.3 | | |
| $ThO_2$ | | | | | | | |
| $Na_2O$ | | | | | | | |
| $K_2O$ | | | | | | | |
| $Ta_2O_5$ | | | 5.9 | 5.6 | | | |
| nd | 1.773 | 1.770 | 1.777 | 1.775 | 1.800 | 1.805 | 1.803 |
| ν | 37.3 | 39.5 | 37.3 | 37.5 | 31.0 | 29 | 32.9 |
| log $a_2$ | 1.4 | | 3.7 | 3.6 | 0.4 | 2.8 | 3.6 |
| W.F. in days | | | | | 19 | | 35 |

*Table 3*

| Oxides | 7 | | | | 8 | |
|---|---|---|---|---|---|---|
| | a | b | c | d | a | b |
| $B_2O_3$ | 23.3 | 14.5 | 19.3 | 29.40 | 20 | 15 |
| $SiO_2$ | 12.3 | 16.2 | 9.9 | | | |
| PbO | 35.3 | 29.5 | 37.1 | 37.8 | 70 | 65 |
| $La_2O_3$ | 2.8 | 9.6 | 17.8 | 14.9 | | 5 |
| $Al_2O_3$ | 1.3 | 5.1 | 13.4 | 15.9 | 10 | 13 |
| BaO | 3.0 | 9.7 | | | | |
| CaO | 4.8 | | | | | |
| ZnO | 14.7 | 14.0 | | | | |
| $ZrO_2$ | | 1.4 | 2.5 | 2.0 | | 2 |
| $ThO_2$ | 2.5 | | | | | |
| nd | 1.723 | 1.723 | 1.723 | 1.723 | 1.825 | 1.843 |
| ν | 38 | 38 | 37.8 | 38.1 | 26.3 | 26.2 |
| log $a_2$ | −1.0 | 2.1 | 3.2 | 3.8 | 1.0 | 3.0 |
| W.F. | 17 | 26 | (≈91) | (≈91) | | |

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A glass composition suitable for optical purposes and having excellent chemical stability consisting essentially of, in percent by weight of the glass, 5 to 67% of PbO, 12 to 16% of $Al_2O_3$, 10 to 45% of $La_2O_3$, 15 to 36% of at least one member of the group consisting of $B_2O_3$ and $SiO_2$, the remainder consisting of a member of the group of 0–7% of a highly refractive oxide of the group of tetravalent and pentavalent oxides, 0–12% of bivalent oxides other than PbO selected from the group consisting of barium, magnesium, calcium, zinc, and strontium oxides, and mixtures thereof, wherein the total of the $B_2O_3$, $SiO_2$, tetravalent, pentavalent and bivalent oxides other than PbO oxides does not exceed 51%.

2. A glass composition according to claim 1 in which said highly refractive oxide is a member of the group consisting of zirconium oxide, titanium oxide, tantalum oxide and niobium oxide.

3. A glass composition according to claim 2 in which said zirconium oxide is present in an amount of not over 5%, said titanium oxide is present in an amount of not over 4% and said tantalum oxide plus niobium oxide is present in an amount of not over 7%.

4. A glass composition according to claim 1 in which said bivalent oxides are present in an amount of not over 7%.

5. A glass composition according to claim 1 in which said $SiO_2$ is present in an amount of less than 20%.

6. A glass composition suitable for optical purposes and having excellent chemical stability consisting essentially of, in percent by weight of the glass, 19.3% of $B_2O_3$, 9.9% of $SiO_2$, 37.1% of $PbO$, 13.4% of $Al_2O_3$, 17.8% of $La_2O_3$, and 2.5% of $ZrO_2$.

References Cited in the file of this patent

UNITED STATES PATENTS

| | | |
|---|---|---|
| 2,406,580 | Bastick et al. | Aug. 27, 1946 |
| 2,477,649 | Pincus | Aug. 2, 1949 |
| 2,584,975 | Armistead | Feb. 12, 1952 |
| 2,678,281 | Geffcken et al. | May 11, 1954 |
| 2,861,000 | Geffcken et al. | Nov. 18, 1958 |
| 3,006,776 | Geffcken et al. | Oct. 31, 1961 |